United States Patent [19]

Winter

[11] Patent Number: 4,729,052
[45] Date of Patent: Mar. 1, 1988

[54] SUPERVISORY SYSTEM FOR IMPEDANCE-EARTHED POWER SYSTEMS

[76] Inventor: Klaus Winter, 12, Kantelevägen, S-196 35 Kungsängen, Sweden

[21] Appl. No.: 887,110
[22] PCT Filed: Nov. 15, 1985
[86] PCT No.: PCT/SE85/00458
§ 371 Date: Jul. 14, 1986
§ 102(e) Date: Jul. 14, 1986
[87] PCT Pub. No.: WO86/03350
PCT Pub. Date: Jun. 5, 1986

[51] Int. Cl.⁴ .............................................. H02H 9/08
[52] U.S. Cl. ........................................ 361/42; 361/43; 361/44; 361/78; 364/481
[58] Field of Search ...................... 361/42–50, 361/65, 78, 58, 76, 86, 87; 323/209–211; 364/480, 482, 483, 492, 571, 481; 307/86, 87; 340/660–664

[56] References Cited

U.S. PATENT DOCUMENTS 3,992,661 11/1976 Kelley, Jr. ........................... 323/210
4,555,658 11/1985 Häusler et al. ...................... 323/210
4,621,198 11/1986 Roberge et al. .................. 323/211 X

FOREIGN PATENT DOCUMENTS 0026260 4/1981 European Pat. Off. ............ 323/210

Primary Examiner—J. R. Scott
Assistant Examiner—Todd E. DeBoer
Attorney, Agent, or Firm—Cushman, Darby & Cushman

[57] ABSTRACT

A device for continuous supervision of the attenuation (d), dissymmetry (k) and mismatch (v) system parameters in impedance earthed power systems. The parameters are calculated from the circle diagram $u_{EN} = f(v)$, i.e., the relative neutral point voltage as a function of the mismatch. The circle diagram is in turn defined by two measuring points for $u_{EN}$ which are derived by connection or disconnection of a reactance complement between system neutral and earth. The invention improves known devices for control of the condition of impedance-earthed power systems. Then the continuous supervision of the mentioned power parameters enables a better detecting of high-resistive earth connections.

The invention can be implemented in any computer system capable of providing the necessary measurement, control and calculating functions.

3 Claims, 5 Drawing Figures

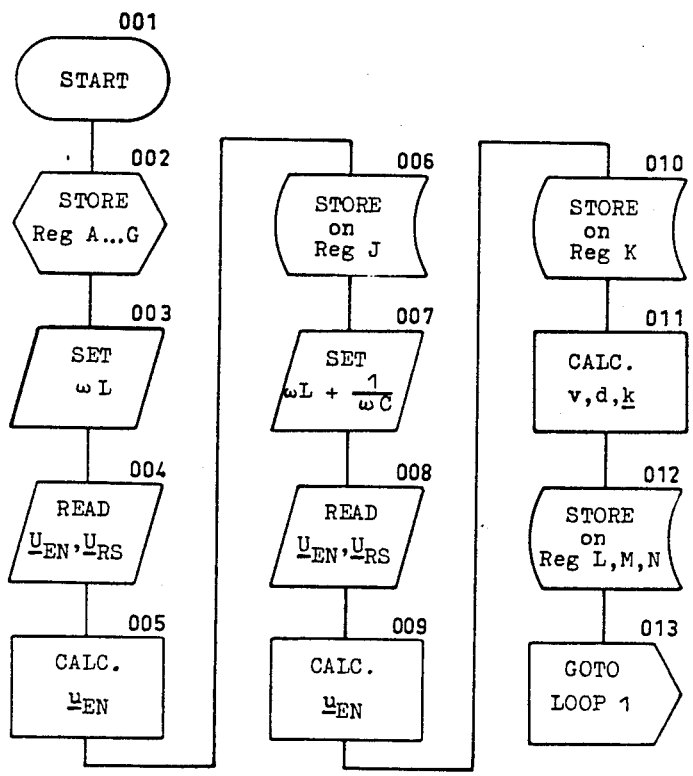

SUPERVISORY SYSTEM FOR IMPEDANCE-EARTHED POWER SYSTEMS

BACKGROUND OF THE INVENTION

This invention relates to a device for supervising impedance-earthed, i.e. non-directly-earthed, power systems. By use of this device, hereinafter referred to as an NX-analyser, a continuous calculation of the attenuation (d), dissymmetry (k) and mismatch (v) parameters of the system from the circle diagram $\underline{u}_{EN}=f(v)$ is provided.

To the extent that the neutral point voltage criterion is used today for monitoring or control purposes, it is purely the value of amplitude that is measured. Amplitude measurement is used, inter alia, for such purposes as indication of abnormal conditions in the power system, such as, for example single-phase earth faults. Use is also made of the resonance curve, or of the relationship between the amplitude of the neutral point voltage and the degree of mistuning, in devices for automatic tuning of Petersen coils.

On the other hand, the fact that a certain neutral point voltage of varying magnitude can occur even in the faultfree condition does limit the applicability of the amplitude criterion method for general monitoring purposes. Here the NX-analyser effects an improvement. The continuous calculation and processing of the values of the above-mentioned system parameters creates a whole set of new criteria for various monitoring and control purposes in the above systems. The following, for example, can be considered:

1. Degree of mistuning (v): Monitoring of the self-extinguishing condition in accordance with DIN 57288 and compliance with the current limiting requirement in accordance with various legal requirements are important means of monitoring non-directly-earthed high-voltage systems. Existing known means for providing such monitoring are connected for automatic tuning of Petersen coils. The majority of devices utilize as control criterion the resonance curve $|U_{EN}|=f(v)$ and the fact that $U_{EN}$ reaches its maximum value at the exact point of tuning (v=0).

Another procedure makes use of the relationship $\phi_{UEN}=f(d)$ where, as known, the angular change falls off with decreasing degree of mistuning (Swiss Pat. No. 532854). However, the common feature of all known tuning procedures is that they require a stepless adjustable neutral point reactor. Monitoring/control is also limited to the control range of the reactor. Such use of a quantitative criterion for the degree of mistuning, independently of the particular coil setting, here provides several benefits. Firstly, no controllable neutral point reactor is required, and secondly, monitoring of the degree of mistuning can continue to operate outside the setting range of the reactor. Use of the NX-analyser also facilitates separation of the monitoring and control functions. In many systems monitoring alone is quite sufficient, and any necessary adjustment of the reactor coil on the few occasions that it is necessary can be done manually.

2. Attenuation (d): The attenuation factor can also be expressed as the quotient of $I_R/I_c$, where $I_R$ is the resistive component of the earth fault current and $I_c$ is the capacitive component. $I_R$ is the result of various losses in the system, of which leakage losses across the surface of insulators generally constitute the major part. Leakage losses increase as the amount of dirt on the insulator surfaces increases. In areas with low levels of precipitation the gradual accumulation of dirt on the surface of insulators can give rise to severe operational problems. In such cases, continuous monitoring of the attenuation factor provides a means of improving the efficiency of preventive maintenance. In combination with the degree of mistuning, the attenuation factor can also be used for controlling compensation devices in accordance with Swedish Pat. No. 8401365-5. By means of this, or similar devices, it is possible to compensate both the reactive and the active components in the earth fault current. Here the NX-analyser creates the conditions for automatic control.

3. Degree of dissymmetry (k): Continuous monitoring of the degree of dissymmetry, and in particular of its relative changes, provides a highly sensitive criterion for detection of various fault states in the power system. In particular, the ability to detect high-impedance earth faults can be mentioned. The total degree of dissymmetry, $\underline{k}_{total}$, of the power system consists of the degrees of dissymmetry $\underline{k}_{L1}$, $\underline{k}_{L2}$ etc. of the individual line sections. These, in turn, are very characteristic and arise as a result of the difference between the capacitive couplings of the phase conductors to earth as a result of their geometrical positions. Switching in or out individual lines thus also changes the calculated total degree of dissymmetry as determined by the NX-analyser, which restricts the practical feasibility of making direct use of $\underline{k}_{total}$ or of its relative changes $\Delta\underline{k}_{total}$ as an earth fault criterion.

SUMMARY OF THE INVENTION

In order to get this around this limitation, the NX-analyser of the present invention generates a further criterion from $\Delta\underline{k}_{total}$ and $\Delta v$. This is because it is possible to assume that the system structure only seldom will change at the same instant that a spontaneous earth fault occurs. In other words, the change in the degree of dissymmetry arising as the result of an earth fault generally occurs without a simultaneous alteration in the degree of mistuning. This factor is utilized in the NX-analyser to generate a criterion which makes it possible to detect even high resistance earth faults.

BRIEF DESCRIPTION OF THE DRAWINGS

A more detailed description of the NX-analyzer requires reference to FIGS. 1-3, of which:

FIG. 3 shows the content of the register used for the program-controlled measurement, control and processing functions of the NX-analyser; and FIGS. 4a and 4b show a flow diagram for the program-controlled measurement, control and pressing functions of the NX-analyzer.

DETAILED DESCRIPTION OF THE PREFERRED EMBODIMENT

Figure 1:
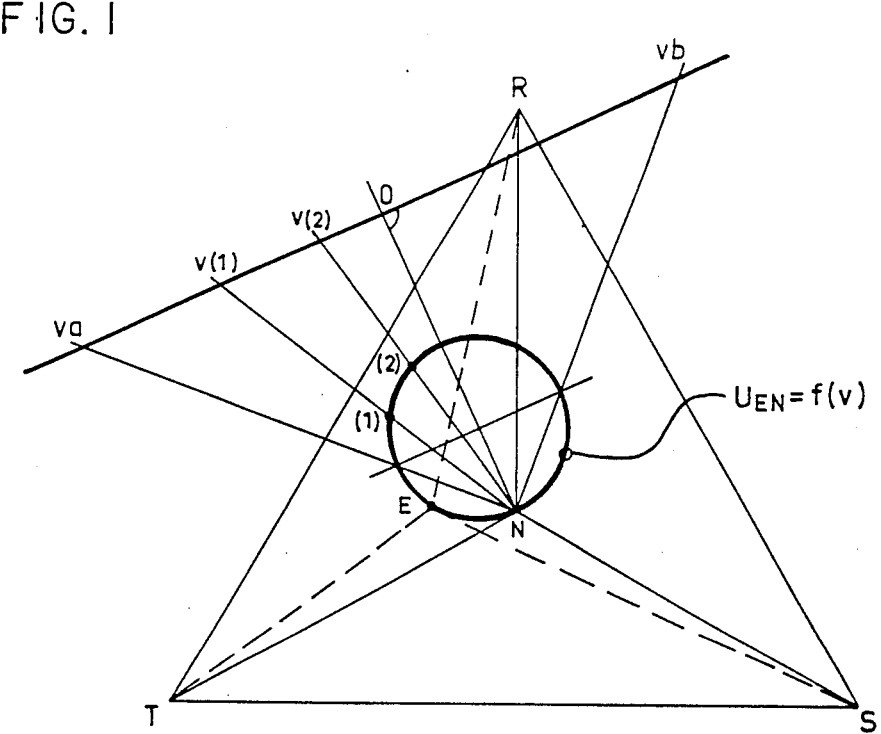
FIG. 1 shows a typical circle diagram, $\underline{U}_{EN}=f(v)$, in a given three-phase system.
Figure 2:
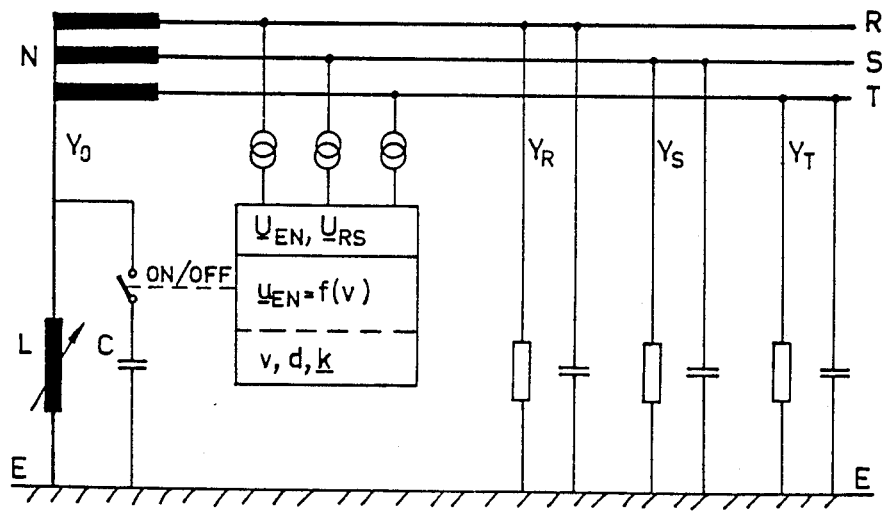
FIG. 2 shows the links between the three-phase system and earth and the external connections of the NX-analyser for measurement and control.

The circular locus $\underline{U}_{EN}=f(v)$, shown in FIG. 1, is determined from three points: the given point at which the curve is a tangent to the neutral point N of the three-phase system and two essentially arbitrary measurement points. These two points are calculated by the NX-analyser through application of a program-controlled change in the zero sequence admittance $Y_o$. In principle, this change can be made in a number of different ways, including that as shown in FIG. 2 in which a capacitive element C is connected at the neutral point. Switching gives rise to the two measured points $\underline{U}_{EN(1)}$ and $\underline{U}_{EN(2)}$ on the circle diagram in FIG. 1. The associated reactance values, $\omega L$ and $(\omega L + 1/\omega C)$, are assumed to be of known magnitude. Corresponding degrees of mistuning are obtained by projection of the measured points on an orthogonal scale on which the point of resonance (v=0) is also shown, as in FIG. 1. Scaling is linear and related to the two known measured points. Derivation of the quotient $\underline{U}_{EN}/\underline{U}_{RS}=\underline{u}_{EN}$ makes determination of the circle diagram locus independent of load. In general, the following relationships apply for the relative neutral point voltage:

$$\underline{u}_{EN} = \frac{\underline{U}_{EN}}{\underline{U}_{RS}} = \frac{Y_R + a^2 Y_S + a Y_T}{Y_R + Y_S + Y_R + Y_O} \quad (1)$$

where $$v = \frac{B_R + B_S + B_T + B_O}{B_R + B_S + B_T} \quad (2)$$

$$d = \frac{G_R + G_S + G_T + G_O}{B_R + B_S + B_T} \quad (3)$$

$$\underline{k} = \frac{Y_R + a^2 Y_S + a Y_T}{B_R + B_S + B_T} \quad (4)$$

which gives $$\underline{u}_{EN} = \underline{k}/(v+d) \quad (5)$$

and, at the resonance point, where v=0:

$$\underline{u}_{EN\,max} = \underline{k}/d. \quad (6)$$

Corresponding derivation of d and $\underline{k}$ from the circle diagram $\underline{u}_{EN}=f(v)$ is as follows:
Equations (5) and (6) give the relationship:

$$\frac{u_{ENmax}}{u_{EN}} = \frac{(v^2 + d^2)^{0.5}}{d} = X \quad (7)$$

with two solutions for v:

$$v_{(a,b)} = \pm d(X^2-1)^{0.5} \quad (8)$$

The two points v(a,b) for which $x=2^{0.5}$ are found from the scale and circle locus in FIG. 1. With these two points, calculation of the two values that are required can finally be concluded from:

$$d = (v_a - v_b)/2 \quad (9)$$

and $$\underline{k} = d\,\underline{u}_{ENmax} \quad (10)$$

A more detailed description of the method of working of the NX-analyser is shown in FIGS. 3 and 4. Figures within brackets refer to sequence steps 001 ... 039 in the flow chart.

The starting sequence (001-003) of the flow chart in FIG. 4a commences with an updating of limit value file A-E shown in FIG. 3. Files F and G are used for storing values of neutral point reactance $\omega L$ and $(\omega L + 1/\omega C)$, respectively. After entry of the neutral point voltage, $\underline{U}_{EN}$, and the reference voltage, $\underline{U}_{RS}$, the initial value of the relative neutral point voltage, $\underline{u}_{EN}$ (005) is calculated, details of the amplitude and phase angle of which are stored in file J (006). The reactance complement C (007) is then connected. The subsequently calculated value of $\underline{u}_{EN}$ is then stored in file K (008 ... 010). By means of the contents of files J and K, and the associated reactance values in files F and G, the NX-analyser calculates the circle diagram $\underline{u}_{EN}=f(v)$ and the initial values for v, d and $\underline{k}$ which are then stored in files L, M and N, respectively (011, 012). The starting sequence is then concluded by means of a jump to LOOP 1 (013).

Figure 4B:
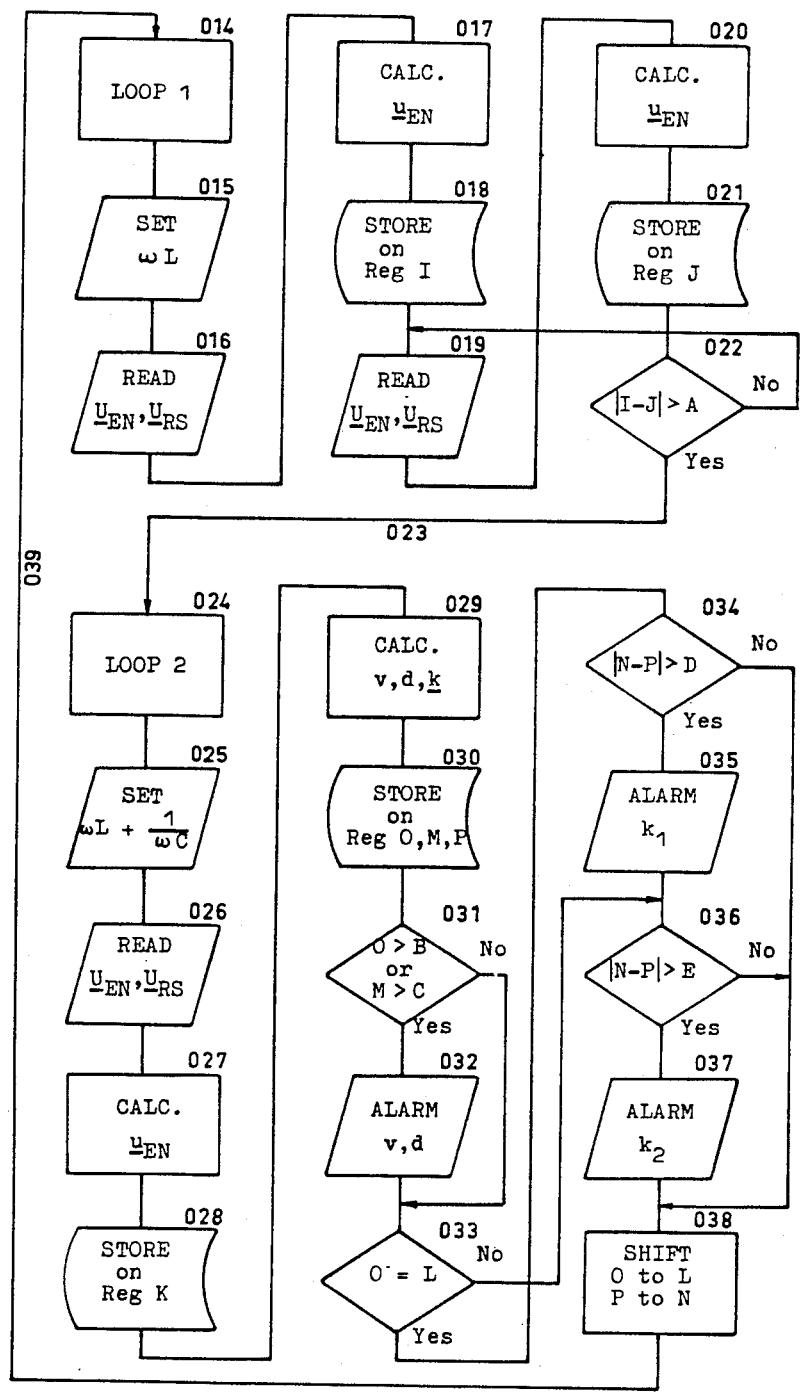

LOOP 1 of FIG. 4b starts, in turn, with calculation of a new starting value for $\underline{u}_{EN}$, which is then loaded into file I (015 ... 018). The initial value is continuously compared with the latest current value of $\underline{u}_{EN}$ in file J (019 ... 022). If the limiting value of $\Delta \underline{u}_{EN}$ is exceeded, the program jumps to LOOP 2 (023). In order to provide regular calculation of system parameters, LOOP 1 in principle can be complemented by a turns counter or time control.

LOOP 2, also shown in FIG. 4b, starts with connection of the reactance complement (025). It then continues by calculating $\underline{u}_{EN}$ (026 ... 028), followed by v, d and $\underline{k}$ (029). v and $\underline{k}$ are temporarily stored in files O and P (030). If any values exceed the specified limiting values, an alarm will be generated (031 ... 037). The relative change in the degree of dissymmetry, $\underline{k}$, is monitored with respect to two limiting levels. Provided that the degree of mistuning is unchanged (033), a comparison will be made with limiting value $k1_{max}$, which, in principle, can be set more tightly than $k2_{max}$. LOOP 2 concludes with transfer of the temporarily stored values of v and k (038) and a jump back to LOOP 1 (039).

The program structure described here can be implemented in any computer system capable of providing the necessary measurement, control and processing functions. A post-connected governing stage can be used to apply the calculated value of degree of mistuning, v, as calculated by the NX-analyser, for automatic control of conventional Petersen coils. However, this controlling circuit requires feedback, in which file F is updated with information on the current coil setting.

I claim:

1. A device for supervision of attenuation (d), dissymmetry (k) and mismatch (v) parameters in a non-directly earthed power system, comprising:
   (a) means for continuously measuring a neutral voltage and a reference voltage in order to define the relative neutral displacement (uEN) with respect to amplitude and phase;
   (b) means for switching in regular intervals or because of a change in the value of the relative neutral displacement a reactance complement between system neutral and earth; and
   (c) means for calculating a circle diagram uEN=f(v) representing the relative neutral voltage as a function of the degree of mismatch using the values for uEN before and after switching of the reactance complement and for calculating the associated values for the d, k and v parameters from the circle diagram.

2. A device according to claim 1, wherein the calculated values for d, k and v are temporarily stored in a data store and said calculating means continuously calculates the relative changes $\Delta d$, $\Delta k$ and $\Delta v$ of the d, k and v parameters, respectively, using the last stored and the next to last stored values from said data store for the respective parameters d, k and v.

3. A device according to claim 1 or 2, wherein a change of dissymmetry $\Delta k$ is compared with a change of mismatch $\Delta v$ so as to detect a high impedance earth fault, a minor change in network symmetry of the power system representing a spontaneous earth fault if corresponding network tuning remains unchanged.

* * * * *